United States Patent [19]

Salvano

[11] 4,256,046
[45] Mar. 17, 1981

[54] PLANT CULTIVATION DEVICES AND METHODS

[75] Inventor: Lori Salvano, Hillside, N.J.

[73] Assignee: Solomon Zaromb, Newark, N.J.

[21] Appl. No.: 24,869

[22] Filed: Mar. 28, 1979

[51] Int. Cl.³ .............................................. A01G 9/02
[52] U.S. Cl. .......................................... 111/1; 111/4; 47/30; 47/73
[58] Field of Search .................. 111/4; 47/73, 25–26, 47/30, 85, 56, 77

[56] References Cited

U.S. PATENT DOCUMENTS

| 536,895 | 4/1895 | Richards | 111/4 |
|---|---|---|---|
| 1,636,625 | 7/1927 | Conrad | 47/73 |
| 1,704,801 | 3/1929 | Miller | 47/30 |
| 2,062,410 | 12/1936 | Garcia | 47/30 |
| 2,173,383 | 7/1879 | James | 111/4 X |
| 3,331,155 | 7/1967 | Chancellor | 47/56 X |
| 3,826,040 | 7/1974 | Roberts et al. | 47/30 |
| 4,008,544 | 2/1977 | Rupprecht et al. | 47/77 |

FOREIGN PATENT DOCUMENTS 769696 3/1957 United Kingdom ................ 47/30

OTHER PUBLICATIONS

Burpee Seed Catalog, 1975, p. 74.

Primary Examiner—Robert E. Bagwill
Attorney, Agent, or Firm—Solomon Zaromb

[57] ABSTRACT

Improved methods and devices for cultivating a young plant comprise temporary insertion into the soil close to and around said plant of a substantially impervious material so as to form a small enclosure assuring retention of most nutrients near said plant. Small perforations in said material permit drainage of excess water from said enclosure. Identations along lines joining said perforations facilitate breaking, tearing or cutting of the material to an appropriate size. A sharp leading edge may be provided along the perforations and indentations to facilitate insertion of the material in the soil around the plant. The material may be in form of an assortment of tubes or of a sheet adaptable to being bent into a cylindrical or conical configuration.

9 Claims, 6 Drawing Figures

4,256,046

PLANT CULTIVATION DEVICES AND METHODS

BACKGROUND

This invention relates to improved methods and devices for cultivating young plants.

In the cultivation of young plants for homes or gardens, the usual procedure at present is to plant seeds or tiny seedlings in relatively small flower pots or similar containers and to subsequently transplant the young plant into bigger containers as the plant grows larger. The transplanting procedure involves not only labor but also a risk of damage to the plant. The alternative procedure of planting a seed or tiny seedling in a full-sized container to start with has the disadvantage of resulting in excessive dilution of vital nutrients during the critical early stages of a plant's life.

SUMMARY OF THE INVENTION

It is an object of my invention to permit the planting of seeds or tiny seedlings in a full-sized container or piece of ground in which the full-grown plant is intended to be located, so as to obviate the need for transplanting procedures, while assuring retention of nutrients near the seed or seedling.

It is a further object of my invention to provide a simple and inexpensive means of assuring the retention of most nutrients near and around a seed or seedling planted in a full-sized container or piece of ground.

It is yet another object of my invention that said means be preferably reusable for the cultivation of other young plants, and that it be adaptable for use with plants of various sizes and in various stages of their growth.

It is still a further object of my invention to provide a simple and inexpensive means for minimizing the risk of damage to those plants which may have to be transplanted for whatever reason.

Briefly, my invention consists of temporarily inserting a substantially impervious material close to and around a seed or young plant to assure retention of most nutrients in the immediate vicinity of said seed or plant. Small perforations within said material permit drainage of excess water and of metabolic waste products. Indentations along lines joining said perforations facilitate breakage, tearing or cutting of the material to appropriate size. A sharp leading edge may be provided along the perforations and indentations to facilitate insertion of the material into the soil around the seed or plant. Said material may be tubular in form or may be in form of a sheet adaptable to being bent into a cylindrical or conical configuration.

BRIEF DESCRIPTION OF THE DRAWING

My invention may be best explained with reference to the drawing, in which.

DESCRIPTION OF THE PREFERRED EMBODIMENTS

Figure 1:
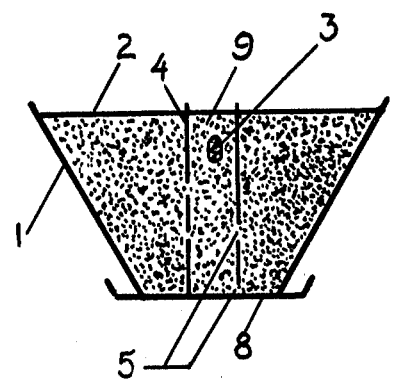
FIG. 1 is a schematic cross-sectional view of one embodiment of my invention.
Figure 2:
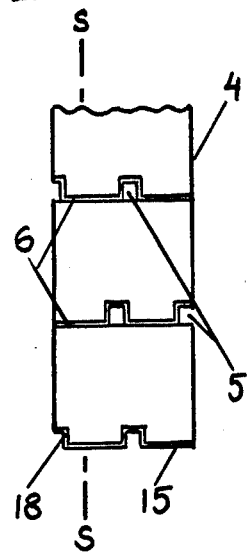
FIG. 2 is a partial front view of the perforated tube of FIG. 1.

In FIG. 1 is shown a flower pot 1 filled with soil 2 and containing a young plant or seed 3 embedded in the upper central portion of the soil. A tube 4 having perforations 5 disposed as shown in FIG. 2 and broken or cut off along one of the indentations 6 of FIG. 2 is pressed into the soil 2 so as to enclose the seed 3 and to reach all the way down to the base 8 of the flower pot, thereby forming an inner compartment 9. Most of the nutrients around seed 3 are thereby retained within compartment 9. The perforations 5 in tube 4 permit drainage of any excess water from compartment 9.

As the plant grows bigger, the first and smallest tube 4 may be withdrawn and replaced by a similar tube of the next larger size. Subsequently, as the plant continues to grow, it may be enclosed by tubes of successively larger sizes until the plant is fullgrown. A set of tubes of increasing sizes may be provided for this purpose.

Figure 3:
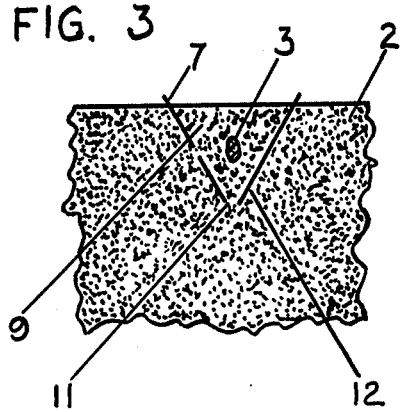
FIG. 3 is a partial cross-sectional view of an alternative embodiment of my invention.
Figure 4:
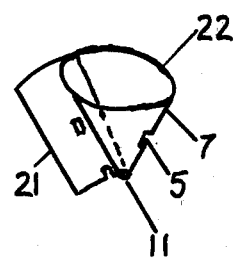
FIG. 4 is a perspective view of the cone-like insert 7 of FIG. 3.

In the alternative preferred embodiment of my invention shown in FIG. 3, a young plant or seed 3 embedded in soil 2 is surrounded by an insert 7 formed of a piece of stiff but flexible sheet 10 (FIG. 5) bent into the cone-like configuration of FIG. 4. Drainage of excess water from the inner compartment 9 enclosed by insert 7 is then provided by either the perforations 5 in sheet 10 or by an opening 11 near the apex of the inverted cone 12 obtained by wrapping sheet 10 into the form of a truncated cone instead of a full cone, as indicated in FIG. 4. Of course, sheet 10 may also be shaped into a cylinder, and inserted in FIG. 1 in lieu of the tube 4.

Figure 5:
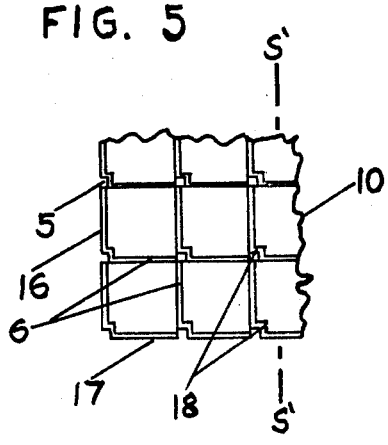
FIG. 5 is a partial front view of the perforated sheet used to form insert 7.

The sheet 10 or tube 4 may be made of a metal, such as iron or aluminum, or out of a large variety of plastic materials, such as polyvinyl, nylon, polyethylene, polypropylene, or of any other suitable material. To permit easy adjustment of tube 4 or sheet 10 to the required length or width, indentations 6 are formed along lines joining the perforations 5, as indicated in FIGS. 2 and 5. To facilitate breakage or cutting of tube 4 or sheet 10 along any of the indentations 6, and to provide a sharp leading edge 15 or 16, 17 for easy insertion into the soil 2, the indentations 6 are preferably in form of asymmetric V-shaped grooves, each groove comprising a short and steep side 20 and a long and shallow side 23, as shown in the magnified partial cross-sectional view of FIG. 6A.

Figure 6:
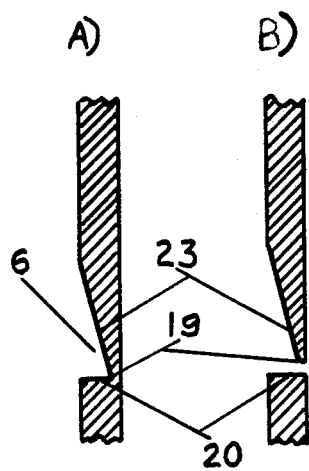
FIG. 6 is a partial magnified view of section S—S or S'—S' of FIG. 2 or FIG. 5.

As indicated in FIG. 6B, the long and shallow side 23 of groove 6, terminates in a sharp edge when tube 4 or sheet 10 is cut off, torn off or broken along the deepest portion 19 of groove 6. A similar edge 18 may be provided around the perforations 5 to assure a continuous sharp leading edge. Insertion of tube 4 or sheet 10 into soil 2 is thereby facilitated.

Although the indentations 6 are preferably disposed along lines joining the perforations 5, as shown in FIGS. 2 and 5, they may also be disposed in any other convenient pattern. Neither is it necessary to provide all the perforations shown in FIGS. 2 or 5 to start with. It may suffice to have such perforations precut in tube 4 or sheet 10, and let the user make as many perforations as necessary by pushing out the precut portions.

As the plant grows bigger, the insert 7 may be withdrawn without disturbing the soil around the plant by exerting a gentle pulling action on the trailing edge 21 and on the upper edge 22 of FIG. 4. Thereafter, a somewhat larger enclosure may be formed by either bending the same piece of material into a wider cone or by using a larger piece of material. Subsequently, as the plant keeps growing, the last insert may again be replaced by a larger insert, and this procedure may be repeated several times until the plant is fullgrown.

The conical enclosure may also be used to minimize the risk of damage to the plant during any necessary transplantation, e.g., when a young plant is purchased from a nursery. The contents of the enclosure may then be kept undisturbed within the cone during the transplantation process, after which insert 7 may be withdrawn and replaced by a larger insert as outlined above.

There will now be obvious to those skilled in the art many variations and modifications of the aforedescribed embodiments which, however, shall remain within the scope of my invention if defined by the following.

I claim:

1. A plant-cultivation device comprising a sheet of material for forming a small enclosure within a portion of soil around a seed or young plant, said sheet being of sufficient stiffness and strength, and so shaped as to be adaptable:
   (a) to being pushed into the soil around said seed or plant to a depth such as to effect retention of most of the nutrients within said enclosure while permitting drainage therefrom of any excess water; and
   (b) to being subsequently withdrawn therefrom without significantly disturbing the soil around said seed or plant;
wherein said sheet is made of a substantially impervious material, and wherein said material has indentations along spaced and substantially parallel lines which permit breakage, cutting or tearing of said material along said indentations for the purpose of adjusting said sheet to an appropriate size.

2. The device of claim 1, wherein said sheet comprises perforations for permitting said drainage, and wherein said indentations are disposed along lines joining said perforations.

3. The device of claim 1, wherein said indentations are in the form of asymmetrical V-shaped grooves providing a sharp leading edge when said material is torn, broken or cut along the deepest portion of a groove.

4. The device of claim 3, wherein said material is in form of a tube capable of being forced through the soil to the base of a container so as to form an enclosure.

5. The device of claim 3, wherein said material is in form of a sheet capable of being curved into a cylinder, truncated cone or full cone, so as to form said enclosure.

6. A plant-cultivating method which comprises:
   (a) inserting a substantially impervious retractable material within the soil around a young plant or seed so as to form an enclosure retaining most nutrients around said plant or seed, said material having one or more openings to permit drainage of excess water;
   (b) as the plant grows larger, withdrawing said retractable material and replacing said small enclosure by a similar larger enclosure; and
   (c) repeating the last step until said plant is fullgrown.

7. The method of claim 6, wherein said retractable material is in the form of a cylinder, and wherein said cylinder is forced down through said soil all the way down to the base of a larger container so as to form a small enclosure within said container.

8. The method of claim 6, wherein said retractable material is in the form of a sheet, and which comprises forcing said sheet into said soil while curving it so as to form an enclosure around said plant or seed in the form of a full or of a truncated cone.

9. The method of claim 8 which also comprises:
   (a') removing said cone together with the plant and soil contained within said enclosure and embedding said cone into a new ambient soil; and
   (b') subsequently withdrawing said sheet without removing said enclosed soil and plant from said ambient soil.

* * * * *